(12) United States Patent
Yuan

(10) Patent No.: US 10,940,520 B2
(45) Date of Patent: Mar. 9, 2021

(54) METHOD AND SYSTEM FOR CONTROLLING DIMENSIONS OF METAL HYDROFORMED PARTS

(71) Applicant: HARBIN INSTITUTE OF TECHNOLOGY, Harbin (CN)

(72) Inventor: Shijian Yuan, Harbin (CN)

(73) Assignee: Harbin Institute of Technology, Heilongjiang (CN)

( * ) Notice: Subject to any disclaimer, the term of this patent is extended or adjusted under 35 U.S.C. 154(b) by 0 days.

(21) Appl. No.: 16/484,959

(22) PCT Filed: Oct. 17, 2018

(86) PCT No.: PCT/CN2018/110564
§ 371 (c)(1),
(2) Date: Aug. 9, 2019

(87) PCT Pub. No.: WO2019/210649
PCT Pub. Date: Nov. 7, 2019

(65) Prior Publication Data
US 2020/0338619 A1    Oct. 29, 2020

(30) Foreign Application Priority Data
May 3, 2018 (CN) .......................... 201810415925.0

(51) Int. Cl.
*B21D 26/027* (2011.01)
*B21D 26/041* (2011.01)

(52) U.S. Cl.
CPC .................................. *B21D 26/041* (2013.01)

(58) Field of Classification Search
CPC .. B21D 26/025; B21D 26/027; B21D 26/039; B21D 26/041; B21D 26/043; G01F 17/00
(Continued)

(56) References Cited

U.S. PATENT DOCUMENTS

| 2,713,314 A * | 7/1955 | Leuthesser, Jr. ..... | B21D 26/047 72/19.9 |
| 2011/0120203 A1* | 5/2011 | Mizumura ........... | B21D 26/047 72/18.6 |

FOREIGN PATENT DOCUMENTS

| CN | 1644264 A | 7/2005 |
| CN | 102806248 A | 5/2012 |

(Continued)

OTHER PUBLICATIONS

Gerhard Hirt et al., Closed-loop control of product properties in metal forming, Jul. 2016, CIRP Annals Manufacturing Technology (Year: 2016).*

(Continued)

*Primary Examiner* — Jason Skaarup
*Assistant Examiner* — Dylan Schommer
(74) *Attorney, Agent, or Firm* — Avant Law Group, LLC

(57) ABSTRACT

Some embodiments of the disclosure provide methods and systems for controlling dimensions of metal hydroformed parts. According to an embodiment, a control method includes: obtaining an inner cavity volume of a target part and an inner cavity volume of a tube blank; injecting a liquid into the tube blank under a high pressure condition; determining a liquid volume compression compensation quantity according to the inner cavity volume of the target part; determining a liquid volume increment-target part corner radius relationship according to the inner cavity volume of the target part, the inner cavity volume of the tube blank, and the liquid volume compression compensation quantity; determining a liquid volume increment according to the liquid volume increment-target part corner radius relationship; and controlling dimensions of a metal hydroformed part according to the liquid volume increment.

6 Claims, 5 Drawing Sheets

(58) Field of Classification Search
USPC .......................................... 72/19.7, 58, 61, 62
See application file for complete search history.

(56) References Cited

FOREIGN PATENT DOCUMENTS

| | | | |
|---|---|---|---|
| CN | 102806248 A | * | 12/2012 |
| CN | 102806248 A | | 12/2012 |
| CN | 102921791 A | | 2/2013 |
| CN | 105562516 A | | 5/2016 |
| CN | 106670296 A | | 5/2017 |
| CN | 106862362 A | | 6/2017 |
| CN | 106874530 A | | 6/2017 |
| JP | 2004230433 A | | 8/2004 |
| JP | 2007237190 A | | 9/2007 |
| JP | 201070128 A | | 7/2011 |
| KR | 20170076054 A | | 7/2017 |

OTHER PUBLICATIONS

Herman George et al., Bulk Modulus: What is it? When is it important?, Aug. 9, 2007, Hydraulic & Pneumatics, https://www.hydraulicspneumatics.com/technologies/hydraulic-fluids/article/21885008/bulk-modulus-what-is-it-when-is-it-important (Year: 2007).*
CN Application No. PCT/CN2018/110564, International Search Report, dated Feb. 12, 2019, 5 pages.
FenYuan, et al. Discussion on 3D Finite Element Simulation Technology in Internal High Pressure Forming, A High Three-Pressure Molding in Dimensional FE Analog Quasi Art Probe Discussed, dated Aug. 6, 2019.

* cited by examiner

METHOD AND SYSTEM FOR CONTROLLING DIMENSIONS OF METAL HYDROFORMED PARTS

CROSS REFERENCE TO RELATED APPLICATIONS

This application is the United States national stage entry under 35 U.S.C. 371 of PCT/CN2018/110564 filed on Oct. 17, 2018, which claims the Chinese priority number 201810415925.0 filed on May 3, 2018, the disclosure of which are incorporated by references herein in their entireties.

FIELD OF THE DISCLOSURE

The disclosure relates generally to the field of metal forming manufacturing. More specifically, the disclosure relates to the field of a method and system for controlling dimensions of a metal hydroformed part, which are mainly used for controlling corner dimensional accuracy of a hydroformed part.

BACKGROUND

Structure light-weighting is one of main approaches for energy conservation and emission reduction of automobiles, aircraft, astronautic vehicles, and other vehicles. For a part that mainly bears bending and torsional loadings, a solid component with a uniform cross section being replaced by a hollow component with a variable cross section, material strength can be made full use of, and light-weighting can also be achieved. A hydroformed part can implement replacing solidness with hollowness, replacing a welding cross section with a closed cross section, and replacing a uniform cross section with a variable cross section. Under the same circumstance, the rigidity and fatigue strength of the part can be improved significantly, and moreover, the mass of the part is also reduced by more than 30% compared with a corresponding stamped and welded part. In view of the foregoing characteristics, hydroformed parts are widely applied in the industrial fields such as automobiles, aeronautics, and astronautics.

In an existing control method for dimensional accuracy of a hydroformed part, the accuracy of dimensions of the formed part, especially a radius of a transition corner with a rectangular or special-shaped cross section, is controlled by controlling the value of a liquid pressure acting on inner surface of a tube blank. A hydroforming process can be divided into a forming stage and a calibrating stage. In the forming stage, most area of the tube blank have been attached to the cavity surface of a die, the length and width of the cross section have met the requirements, and only a transition corner area is not attached to the die surface yet. In the calibrating stage, the pressure is greatly increased to enable the corner to fully attach to the die surface, so that the radius of the corner meets a required target value. Therefore, dimensional accuracy control of the corner is a difficult problem in hydroforming. The pressure is relatively low in the forming stage, and the pressure is rather high in the calibrating stage. A loading path of the internal pressure in the forming process is set in accordance with the forming stage and the calibrating stage. The internal pressure needs to be controlled precisely in real time in the forming process. However, it is difficult to precisely control such a variable as internal pressure change quickly. For example, if a liquid pressure is increased by 200 MPa within 3 to 5 s, the value of the internal pressure will fluctuate. For the calibrating stage, the precise control over the internal pressure is particularly important, and the fluctuation in the value of the internal pressure cannot be ignored. As the value fluctuates, an excessively high or excessively low internal pressure affects the dimensional accuracy of the corner of the formed part. The calibrating stage requires a rather high internal pressure to enable the corner to attach to the die. However, the tube will be broken if the internal pressure is excessively high, while if the internal pressure is excessively low, the dimensions will be smaller than designed values, causing a large size scatter and poor accuracy, and thus resulting in a high rejection rate. To solve the problems in the dimensional accuracy control of the hydroformed part, researchers propose the following methods.

1. A rational loading path is determined by using an adaptive simulation method without causing wrinkles on the tube wall, so as to ensure the dimensional accuracy of a formed part. A slope method and a volume method are used for wrinkle measurement. However, in the slope method, only occurrence of wrinkles can be determined, but the severity of the wrinkles cannot be determined. In the volume method, it is set that the volume of a wrinkled part is greater than a designed volume; however, wrinkles usually occur in a free bulging stage before attachment to a die surface, and in this stage, the volume of the wrinkled part may be smaller than the designed volume. Therefore, this method cannot accurately ensure the dimensional accuracy of the formed part.

2. In a method for controlling dimensional accuracy of a hydroformed part on the basis of combination with an internal pressure and an axial feeding force the relationship curves of the internal pressure and the axial feeding force with respect to time in all stages of forming are given, fitting is performed by using a linear relation for each stage. However, it is indicated by the results that the dimensional accuracy control of the formed part by a linear control model has a certain deviation.

3. A conception of controlling a forming process based on an internal pressure is proposed, and a flowchart of hydroforming based on internal pressure control is provided, but related details of the dimensional accuracy control of a formed part are not involved.

Because none of the control methods for dimensions of a hydroformed part employed in the prior works can prevent such a characteristic that the internal pressure is a variable from affecting the dimensions of the formed part, parts formed through the foregoing control methods are low in dimensional accuracy.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

Some embodiments of the disclosure provide a method and system for controlling dimensions of a metal hydroformed part.

In some embodiments, a method for controlling dimensions of a metal hydroformed part is provided. Dimensional accuracy of a tube is controlled through a volume of a liquid injected into a tube blank, and a technical process of the method includes the following steps. (1) Obtaining an inner cavity volume of a target part and an inner cavity volume of the tube blank. (2) Injecting the liquid into the tube blank under a high pressure condition. (3) Determining a liquid volume compression compensation quantity according to the inner cavity volume of the target part. (4) Determining a liquid volume increment-target part corner radius relationship according to the inner cavity volume of the target part, the inner cavity volume of the tube blank, and the liquid volume compression compensation quantity. (5) Determining a liquid volume increment according to the liquid volume increment-target part corner radius relationship. (6) Controlling dimensions of a metal tube blank according to the liquid volume increment, to form a metal hydroformed part.

Optionally, the determining a liquid volume compression compensation quantity according to the inner cavity volume of the target part includes: (1) obtaining a liquid bulk modulus of the liquid injected into the tube blank, and (2) determining the liquid volume compression compensation quantity according to the liquid bulk modulus and the inner cavity volume of the target part.

Optionally, the determining a liquid volume increment-target part corner radius relationship according to the inner cavity volume of the target part, the inner cavity volume of the tube blank, and the liquid volume compression compensation quantity includes: determining the liquid volume increment-target part corner radius relationship by using a formula $$\Delta V_L = (V - V_0) + \frac{t\sigma_s V}{E_V r - t\sigma_s}.$$

In this formula, $\Delta V_L$ is the liquid volume increment, V is the inner cavity volume of the target part, $V_0$ is the inner cavity volume of the tube blank, t is a wall thickness of the part, $\sigma_s$ is a material yield strength of the tube blank, $E_V$ is a bulk modulus of the liquid medium, and r is a radius of a cross-section transition corner of the target part.

Optionally, the determining a liquid volume increment according to the liquid volume increment-target part corner radius relationship includes: (1) obtaining an expected corner radius of the target part, the expected corner radius being a corner radius of the target part after forming, and (2) determining the liquid volume increment according to the liquid volume increment-target part corner radius relationship and the expected corner radius.

In other embodiments, a dimension control system for a metal hydroformed part includes an inner cavity volume obtaining module, a liquid volume compression compensation quantity determining module, a liquid volume increment-target part corner radius relationship determining module, a liquid volume increment determining module, and a control module. The inner cavity volume obtaining module is configured to obtain an inner cavity volume of a target part and an inner cavity volume of a tube blank. The liquid volume compression compensation quantity determining module is configured to inject a liquid into the tube blank under a high pressure condition, and determine a liquid volume compression compensation quantity according to the inner cavity volume of the target part. The liquid volume increment-target part corner radius relationship determining module is configured to determine a liquid volume increment-target part corner radius relationship according to the inner cavity volume of the target part, the inner cavity volume of the tube blank, and the liquid volume compression compensation quantity. The liquid volume increment determining module is configured to determine a liquid volume increment according to the liquid volume increment-target part corner radius relationship. The control module is configured to control dimensions of a metal tube according to the liquid volume increment, to form a metal tubular part.

Optionally, the liquid volume compression compensation quantity determining module includes a liquid bulk modulus obtaining unit and a liquid volume compression compensation quantity determining unit. The liquid bulk modulus obtaining unit is configured to obtain a liquid bulk modulus of the liquid injected into the tube blank. The liquid volume compression compensation quantity determining unit is configured to determine the liquid volume compression compensation quantity according to the liquid bulk modulus and the inner cavity volume of the target part.

Optionally, the liquid volume increment-target part corner radius relationship determining module includes: a liquid volume increment-target part corner radius relationship determining unit, configured to determine the liquid volume increment-target part corner radius relationship by using a formula $$\Delta V_L = (V - V_0) + \frac{t\sigma_s V}{E_V r - t\sigma_s}.$$

In this formula, $\Delta V_L$ is the liquid volume increment, V is the inner cavity volume of the target part, $V_0$ is the inner cavity volume of the tube blank, t is a wall thickness of the part, $\sigma_s$ is a material yield strength of the tube blank, $E_V$ is a bulk modulus of the liquid medium, and r is a radius of a cross-section transition corner of the target part.

Optionally, the liquid volume increment determining module includes an expected corner radius obtaining unit and a liquid volume increment determining unit. The expected corner radius obtaining unit is configured to obtain an expected corner radius of the target part, the expected corner radius being a corner radius of the target part after forming. The liquid volume increment determining unit is configured to determine the liquid volume increment according to the liquid volume increment-target part corner radius relationship and the expected corner radius.

In further embodiments, the disclosure provides a method and system for controlling dimensions of a metal hydroformed part, which may improve the accuracy of control over dimensions of a metal hydroformed part, thereby improving the dimensional accuracy of the metal hydroformed part.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure without creative efforts shall fall within the protection scope of the disclosure.

Figure 1:
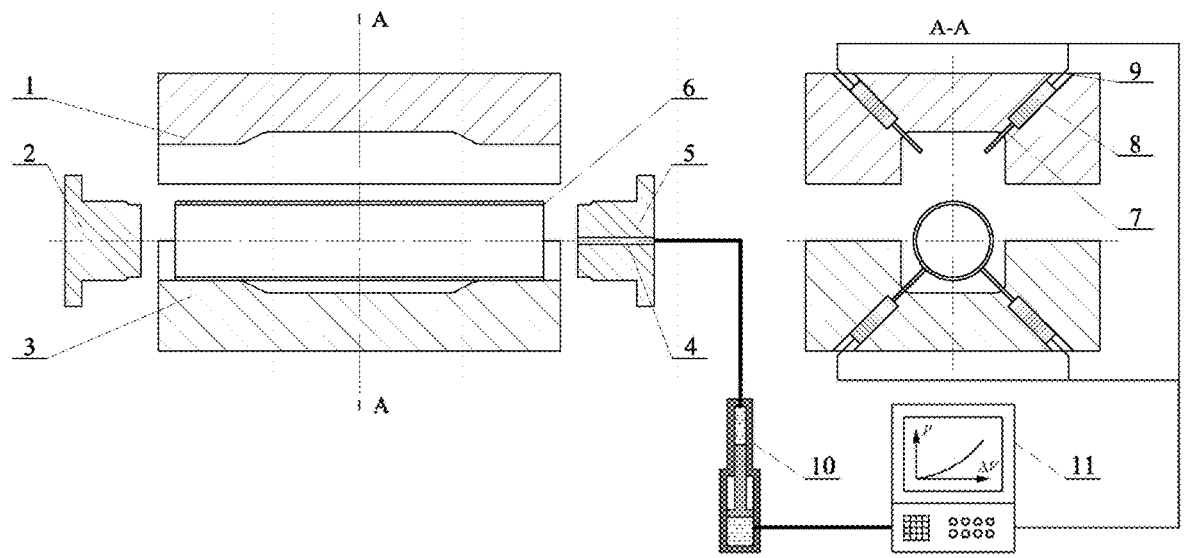
FIG. 1 is a schematic diagram of a position relation between a die and a tube blank in an initial stage.

FIG. 1 is a schematic diagram of a position relation between a die and a tube blank in an initial stage according to the disclosure. As shown in FIG. 1, four contact displacement sensors 8 are placed in displacement sensor mounting grooves 9 corresponding to four corners. An upper die 1 and a lower die 3 are assembled on a press, the lower die 3 is fixed, and the upper die 1 is moved upwards to a set height, to open the space for placement of a tube blank 6. The material of the tube blank 6 is high-strength steel. The upper die 1 is not in contact with the tube blank 6, and the tube blank 6 is placed in an inner cavity of the lower die 3. A left seal punch 2, a right seal punch 5, and a tube blank 6 are at the same level. The contact displacement sensors 8 are placed in the displacement sensor mounting grooves 9. Two displacement sensor contacts 7 in the lower die are already in contact with the tube blank 6.

Figure 2:
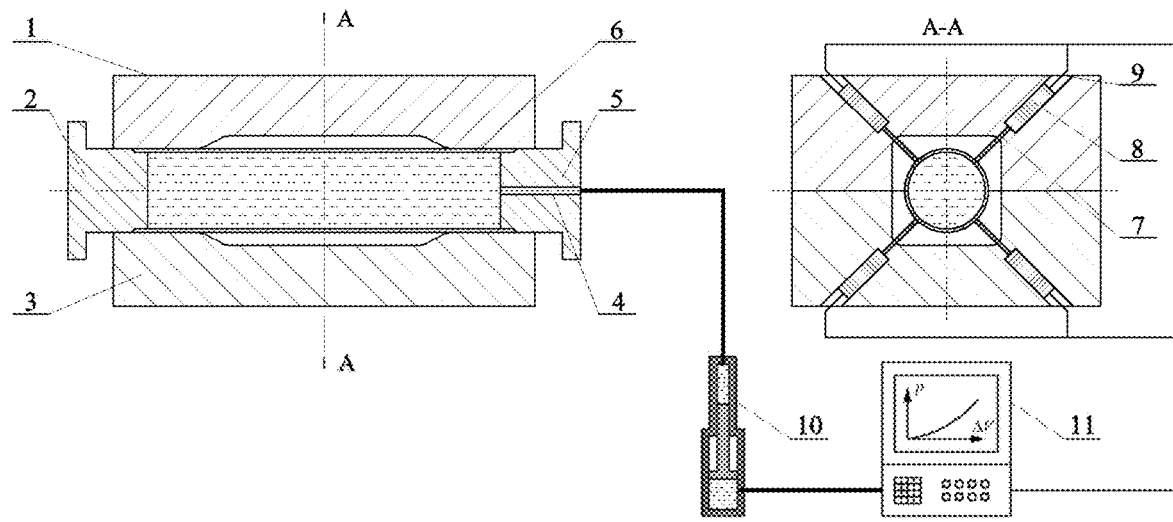
FIG. 2 is a schematic diagram of a position relation between a die and a tube blank in a die closing stage.

As shown in FIG. 2, a main slider of the press is controlled to move, so that the upper die 1 moves downwards to close the die. The displacement sensor contacts 7 on the four contact displacement sensors 8 are in contact with the tube blank 6. The first seal punch 2 and the second seal punch 5 move towards each other, so that the tube blank 6 forms a closed cavity with the first seal punch 2 and the second seal punch 5. An injection hole 4 on the second seal punch 5 is connected to a high pressure source 10 through an oil pipeline. Then, a medium is injected into the inner cavity of the tube blank 6 through the injection hole 4, so that the inner cavity of the tube blank 6 is filled with the liquid medium. A control system 11 starts to calculate a liquid volume compression compensation quantity ΔV. By using a liquid volume increment-target part corner radius relationship, a volume increment $ΔV_L$ of a liquid that needs to be injected into the tube blank 6 for forming may be calculated according to the liquid volume compression compensation quantity ΔV. At the same time, the control system 11 feeds back radius values of cross-section corners of the tube measured by the sensors 8, and a current inner cavity volume of a target part may be calculated by using a geometrical relationship. Under the condition that the real-time inner cavity volume of the target part is known, precise control over the dimensional accuracy of the target part may be implemented by controlling $ΔV_L$ according to the corresponding relationship between the liquid volume increment $ΔV_L$ and the corner radius r. The upper die 1 moves downwards to close the die. The left seal punch 2 and the right seal punch 5 feed towards end portions of the tube blank 6 at the same time, and feed rates of the two punches are kept the same, until the ends of the tube are sealed. The high pressure source 10 injects the medium into the injection hole 4 of the right seal punch through the oil pipeline to increase the pressure, so that the inner cavity of the tube blank 6 is filled with the liquid medium.

Figure 3:
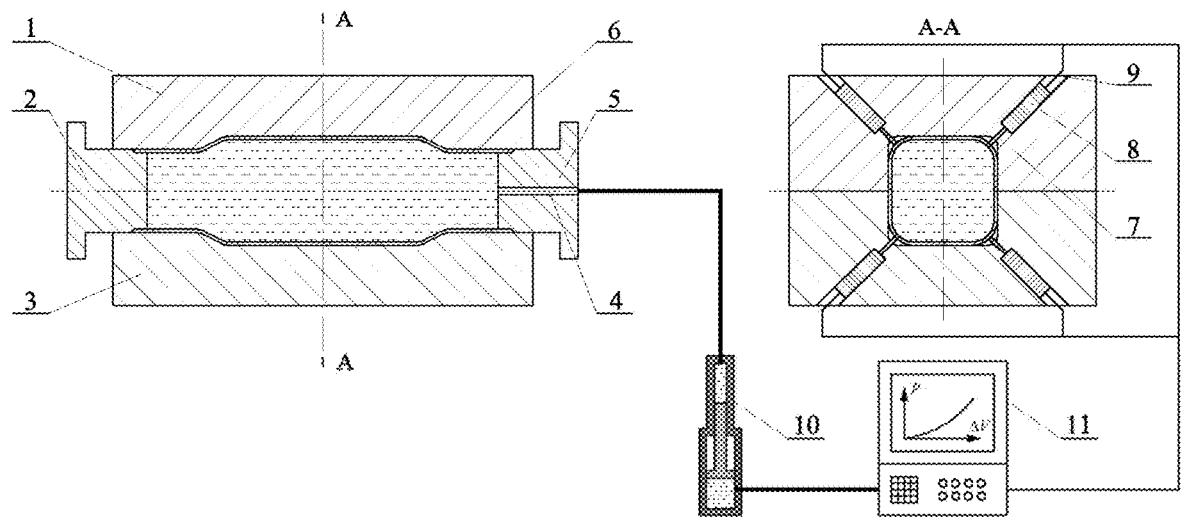
FIG. 3 is a schematic diagram of a position relation between a die and a tube blank in a forming stage.

As shown in FIG. 3, the high pressure source 10 continues to inject the liquid medium into the inner cavity of the tube blank 6. The displacement sensor contacts 7 move as the tube blank 6 is deformed. The control system 11 converts a fed back displacement signal into a corner radius. The control system 11 measures the current dimensional accuracy of the hydroformed part according to the corresponding relationship between the liquid volume increment $ΔV_L$ and the corner radius r, thereby determining whether to continue to inject the liquid medium and a specific volume of the liquid that needs to be injected. At the same time, the control system 11 corrects possible deviations of other fixed parameters in the relation according to real-time data of the liquid volume increment and the corner radius. The first seal punch 2 and the second seal punch 5 feed towards each other along an axial direction of the tube blank 6, to feed the material into the tube blank 6. Under the combined effect of the liquid medium in the cavity and the axial feed, the tube blank 6 is deformed, and the straight side is substantially attached to the die. The feed rates of the punches and the liquid volume increment are adjusted. The tube blank 6 bulges under the combined effect of the axial feed and the liquid medium in the inner cavity. The straight side part is substantially attached to the die, and the corner part is not fully formed yet.

Figure 4:
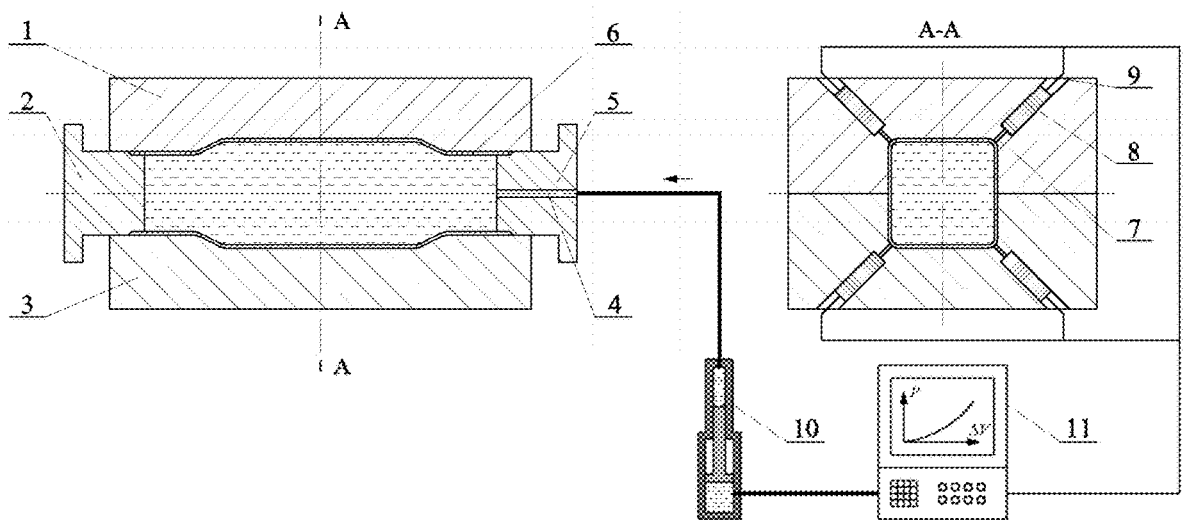
FIG. 4 is a schematic diagram of a position relation between a die and a tube blank in a calibrating stage.

As shown in FIG. 4, the high pressure source 10 continues to inject the liquid medium of the tube blank 6, and the corner of the tube blank 6 is formed under the effect of the internal pressure. The displacement sensor contacts 7 detect that the corner radii reach a design requirement, feedback signals to the control system 11. The control system 11 issues an instruction so that the high pressure source 10 stops injection of the liquid medium. The high pressure source 10 releases the internal pressure of the tube blank 6, and the main slider drives the upper die 1 to move upwards. The first seal punch 2 and the second seal punch 5 retreats along the axial direction of the tube blank 6 at the same time, so that tube 6 is separated from the seal punches 2 and 5, thus obtaining a hydroformed part 6 with dimensional accuracy meeting the design requirement. The liquid volume increment required for forming the target part is calculated by using the relation between the liquid volume increment and the corner radius. The liquid medium of the calculated volume is injected into the inner cavity of the tube blank 6. The corner part is attached to the die for forming. The displacement sensor contacts 7 detect that the corner forming reaches the design requirement. After the control system obtains the signals, the high pressure source stops injecting the liquid medium, and hydroforming is completed.

Figure 5:
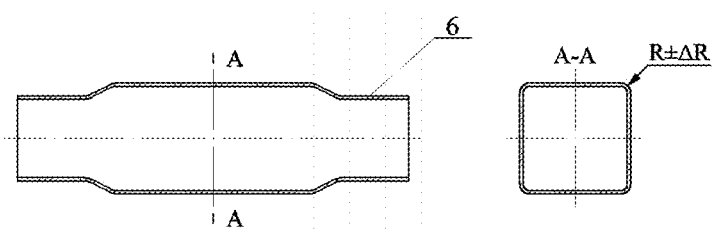
FIG. 5 is a schematic diagram of a metal hydroformed part obtained through hydroforming in a liquid control manner.
Figure 6:
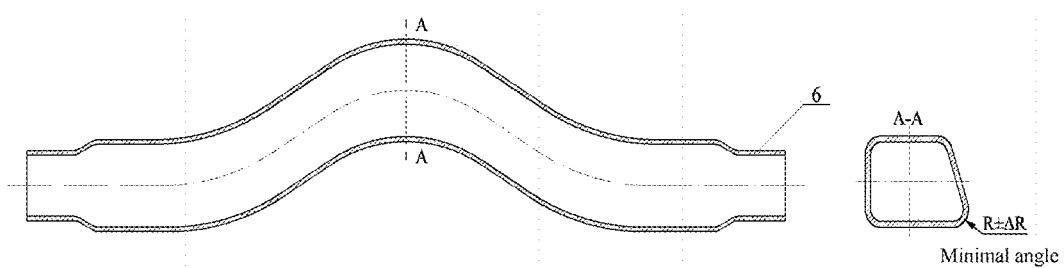
FIG. 6 is a schematic diagram of a metal hydroformed bent tubular part obtained through hydroforming in a liquid control manner.

FIG. 5 is a schematic diagram of a metal hydroformed part obtained through hydroforming in a liquid control manner according to the disclosure. In addition, a tube bending process may also be performed before hydroforming of the tubular part shown in FIG. 2, and a hydroformed bent tubular part with a variable cross section is finally obtained. The cross section is trapezoidal. The minimum corner is located at the lower right corner of the cross section of the tube, as shown in FIG. 6.

Figure 7:
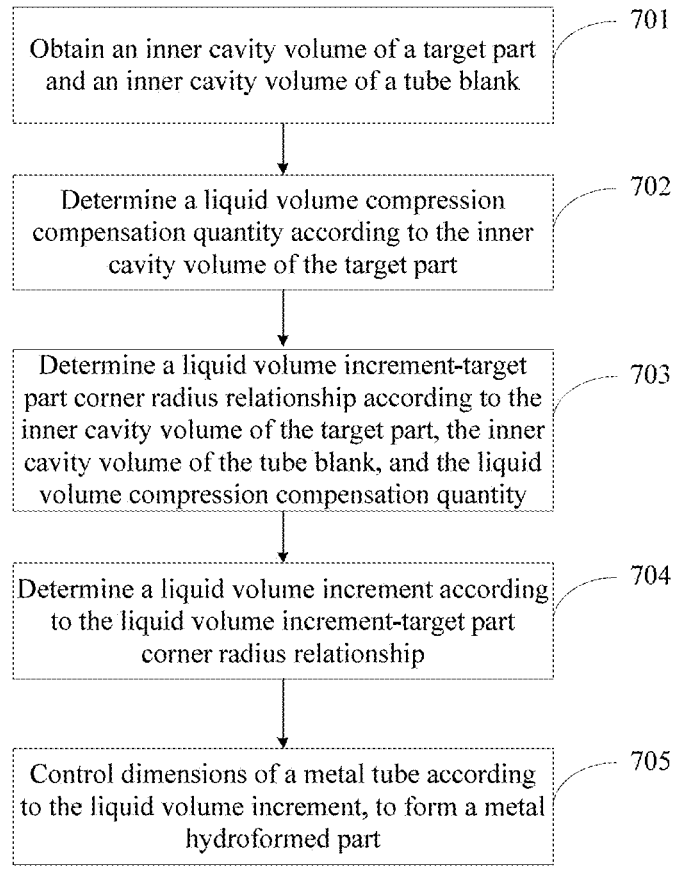
FIG. 7 is a flowchart of a dimensions control method for a metal hydroformed part.

FIG. 7 is a flowchart of a dimensions control method for a metal hydroformed part according to the disclosure. As shown in FIG. 7, a dimensions control method for a metal hydroformed part includes the following steps.

Step 701: Obtain an inner cavity volume of a target part and an inner cavity volume of a tube blank.

Step 702: Inject a liquid into the tube blank under a high pressure condition, and determine a liquid volume compression compensation quantity according to the inner cavity volume of the target part.

Step 703: Determine a liquid volume increment-target part corner radius relationship according to the inner cavity volume of the target part, the inner cavity volume of the tube blank, and the liquid volume compression compensation quantity.

Figure 8:
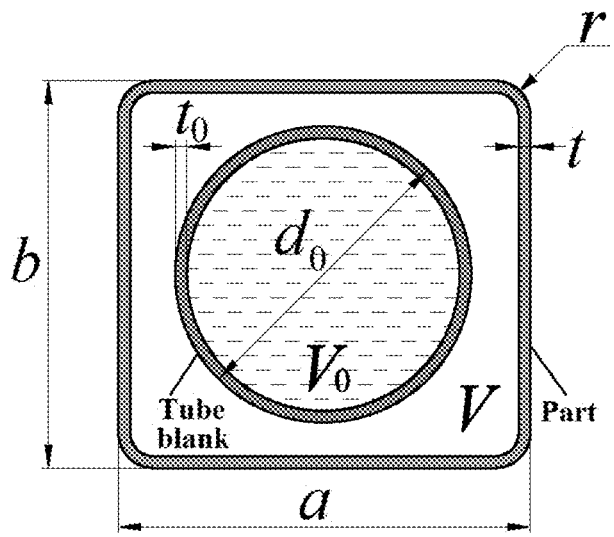
FIG. 8 is a schematic diagram of a relationship between an inner cavity volume of a target part and an inner cavity volume of a tube blank.
Figure 9:
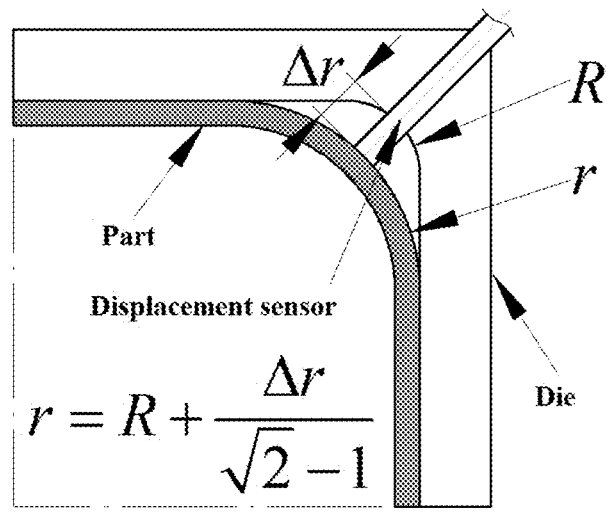
FIG. 9 is a schematic diagram of a relationship between a corner radius of a die and a corner radius of a part.

As shown in FIG. 8 to FIG. 9, a diameter $d_0$ and a wall thickness $t_0$ of the tube blank are determined. Material yield strength $\sigma_s$ of the tube blank is measured. An inner cavity volume $V_0$ of the tube blank is calculated. A length a and a width b of the cross section of the target part of hydroforming, and a transition corner radius r are determined. The inner cavity volume V of the target part is calculated according to a design requirement. A difference $\Delta V_0 = V - V_0$ between the inner cavity volumes of the target part and the tube blank is calculated. It is determined that a transition corner radius of an inner cavity of a die is R. Displacement sensors are disposed at corners of the die. A distance from a sensor contact to the vertex of the corner of the die is $\Delta r$. Then the transition corner radius r is calculated as follows.

$$r = R + \frac{\Delta r}{\sqrt{2} - 1} \tag{1}$$

In formula (1), r≥R, and a liquid medium bulk modulus $E_V$ for hydroforming is determined. After the inner cavity of the tube blank is filled with the liquid, the liquid of a volume increment $\Delta V_L$ for hydroforming needs to be injected. When compression compensation is not taken into consideration, the liquid volume increment is equal to the difference between the inner cavity volumes.

$$\Delta V_L = \Delta V_0 \tag{2}$$

Under the high pressure condition, compression compensation needs to be taken into consideration.

$$\Delta V_L = \Delta V_0 + \Delta V \tag{3}$$

In formula (3), $\Delta V$ is a liquid volume compression compensation quantity. A calculation formula of a liquid volume compression theory is shown in the following formula (4).

$$p = E_V \frac{\Delta V}{V + \Delta V} \tag{4}$$

In formula (4), p is an internal pressure, $E_V$ is a liquid bulk modulus, V is an inner cavity volume of the target part, and $\Delta V$ is a liquid volume compression compensation quantity.

In the hydroforming process, the highest internal pressure is required in a calibrating stage to form the smallest corner and ensure the dimensional accuracy. A formula for calculating the pressure required in this stage is as shown in the following formula (5).

$$p = t\sigma_s/r \tag{5}$$

The formula (5) is substituted into the formula (4), to obtain a variation relation between the liquid volume compression compensation quantity and the transition corner radius of the target part as shown in the following formula (6).

$$\Delta V = \frac{t\sigma_s V}{E_V r - t\sigma_s} \tag{6}$$

The formula (6) is substituted into the formula (3), to obtain a variation relation between the liquid volume increment and the transition corner radius of the target part as shown in the following formula (7).

$$\Delta V_L = (V - V_0) + \frac{t\sigma_s V}{E_V r - t\sigma_s} \tag{7}$$

In formula (7), $\Delta V_L$ represents a liquid volume increment (unit: L), V represents an inner cavity volume of the target part of hydroforming (unit: L), $V_0$ represents an inner cavity volume of the tube blank (unit: L), t represents a wall thickness of the part (unit: mm), $\sigma_s$ represents a material yield strength of the tube blank (unit: MPa), $E_V$ represents a liquid medium bulk modulus (unit: MPa), and r represents a radius of a cross-section transition corner of the target part (unit: mm).

Step 704: Determine a liquid volume increment according to the liquid volume increment-target part corner radius relationship.

Step 705: Control dimensions of a metal tube according to the liquid volume increment, to form a metal hydroformed part.

The disclosure implements precise control over the dimensional accuracy of the corner of the hydroformed part by controlling the volume of the liquid injected into the inner cavity of the tube blank, which may solve the problems of a large size scatter, poor accuracy, and a high rejection rate of the conventional pressure loading-based hydroforming technology.

A corresponding relationship between the liquid volume increment for hydroforming and the corner radius is established by considering the liquid volume compression compensation quantity under the high pressure condition. In the hydroforming process, the sensor is configured to measure a radius value of the currently formed corner of the tube, the measured corner radius value is fed back to the control system. The control system calculates, according to the relationship between the liquid volume increment and the corner radius, a volume increment of the liquid medium that needs to be injected. The high pressure source injects the liquid medium of the required volume into the tube, thus implementing precise control over the dimensional accuracy of the formed part. Meanwhile, the dimensional accuracy of the corner of the hydroformed part is not dependent on the accuracy of the die, but is dependent on the accuracy of the volume of the injected liquid. In the forming process, corner radii of the tube correspond to liquid volume increments in a one-to-one manner. The corner of the tube may meet the design requirement without being fully attached to the die surface, thereby simplifying the operation steps.

Figure 10:
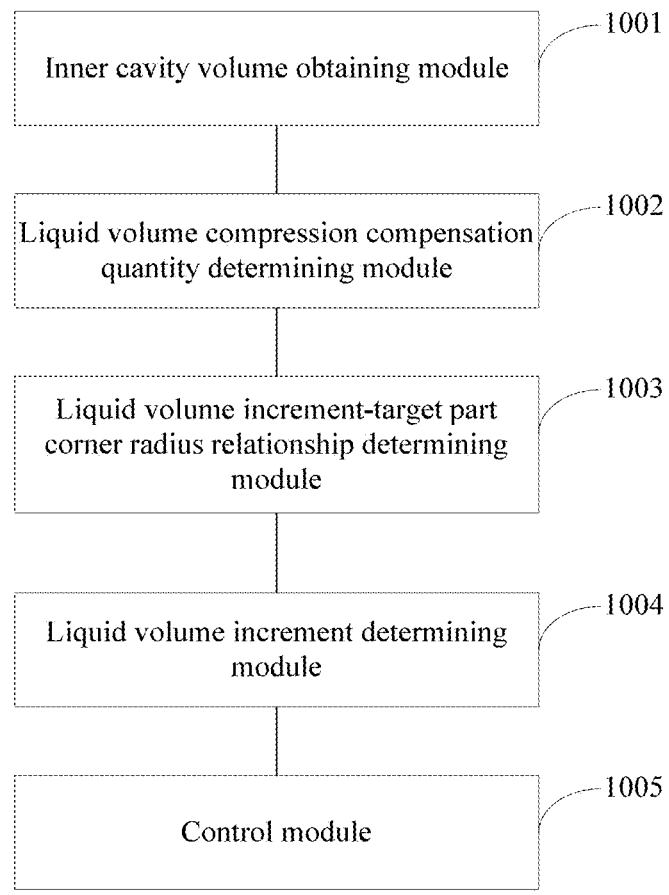
FIG. 10 is a structural diagram of a dimensions control system for a metal hydroformed part.

FIG. 10 is a structural diagram of a dimensions control system for a metal hydroformed part according to the disclosure. As shown in FIG. 10, a dimensions control system for a metal hydroformed part includes the following modules.

An inner cavity volume obtaining module 1001 is configured to obtain an inner cavity volume of a target part and an inner cavity volume of a tube blank.

A liquid volume compression compensation quantity determining module 1002 is configured to inject a liquid into the tube blank under a high pressure condition, and determine a liquid volume compression compensation quantity according to the inner cavity volume of the target part.

The liquid volume compression compensation quantity determining module 1002 includes: a liquid bulk modulus obtaining unit, configured to obtain a bulk modulus of the liquid injected into the tube blank; and a liquid volume compression compensation quantity determining unit, configured to determine the liquid volume compression compensation quantity according to the liquid bulk modulus and the inner cavity volume of the target part.

A liquid volume increment-target part corner radius relationship determining module 1003 is configured to determine a liquid volume increment-target part corner radius relationship according to the inner cavity volume of the target part, the inner cavity volume of the tube blank, and the liquid volume compression compensation quantity.

The liquid volume increment-target part corner radius relationship determining module 1003 includes: a liquid volume increment-target part corner radius relationship determining unit, configured to determine the liquid volume increment-target part corner radius relationship by using a formula $$\Delta V_L = (V - V_0) + \frac{t\sigma_s V}{E_V r - t\sigma_s}.$$

In this formula, $\Delta V_L$ is the liquid volume increment, V is the inner cavity volume of the target part, $V_0$ is the inner cavity volume of the tube blank, t is a wall thickness of the part, $\sigma_s$ is a material yield strength of the tube blank, $E_V$ is a liquid bulk modulus, and r is a radius of a cross-section transition corner of the target part.

A liquid volume increment determining module 1004 is configured to determine a liquid volume increment according to the liquid volume increment-target part corner radius relationship.

The liquid volume increment determining module 1004 includes: an expected corner radius obtaining unit, configured to obtain an expected corner radius of the target part, the expected corner radius being a corner radius of the target part after forming; and a liquid volume increment determining unit, configured to determine the liquid volume increment according to the liquid volume increment-target part corner radius relationship and the expected corner radius.

A control module 1005 is configured to control dimensions of a metal tube according to the liquid volume increment, to form a metal hydroformed part.

An Exemplary Embodiment

Using a DP590 steel tubular part with square cross section as an example. A diameter $d_0$ of a tube blank is 65 mm, a wall thickness $t_0$ of a tube blank is 2.6 mm, a tube length $l_0$ is 300 mm, a material yield strength $\sigma_s$ is 570 MPa, a length a of the cross section is 84 mm, a width b of the cross section is 66 mm, a radius r of a transition corner is 7.6±0.1 mm (with an expansion rate of 40.6%). A corresponding relationship between the liquid volume increment $\Delta V_L$ and the transition corner radius r of the target part is obtained according to the formula (7), that is $$\Delta V_L = (V - V_0) + \frac{t\sigma_s V}{E_V r - t\sigma_s}.$$

The liquid bulk modulus $E_V$ is 1950 MPa, the inner cavity volume of the tube blank is $$V_0 = \pi \left(\frac{d_0}{2} - t_0\right)^2 l_0,$$

and by substituting the known parameters into the formula, it is obtained that $V_0$=0.84 L. A relationship between the inner cavity volume V of the target part and the corner radius r is obtained according to a geometrical relationship of a rectangular cross section, that is, V=[(a−2r−2$t_0$)·(b−2r−2$t_0$)+ 2(r−$t_0$)(a+b−4r−4$t_0$)+π(r−$t_0$)$^2$]$l_0$. By substituting the known parameters into the formula, it is obtained that V=1.22 L. Then, a difference between the inner cavity volumes of the target part and the tube blank is $\Delta V_0$=V−$V_0$=0.38 L. By substituting the transition corner radius r=7.6 mm and related parameters into the relation between the liquid volume increment $\Delta V_L$ and the corner radius r, it is obtained that $\Delta V_L$=0.52 L. That is, after the tube blank is filled with the liquid, the volume $\Delta V_L$ of the liquid that needs to be injected into the tube blank for forming is 0.52 L.

Step 1. Determine related parameters of a tube.

Step 2. Establish a relationship between a liquid volume increment $\Delta V_L$ and a corner radius r. After a tube blank is filled with the liquid, a volume $\Delta V_L$ of the liquid injected into the tube blank for forming is 0.52 L, and the value is input to an internal pressure control system.

Step 3. Place a DP590 tube blank in a die.

Step 4. An upper die moves downwards to close the die; contacts of contact displacement sensors are in contact with an external side of the tube blank; seal punches feed to seal the tube blank; the inner cavity of the tube blank is filled with the liquid medium through an injection hole; the tube blank bulges under the action of the liquid medium, and values of the displacement sensors change.

Step 5. A high pressure source continues to inject the liquid medium; the displacement sensor contacts detect that values of the corner radii change; the control system determines the forming accuracy, and corrects deviations of fixed parameters in the relationship between the liquid volume increment $\Delta V_L$ and the corner radius r; the seal punches feed the material, and the straight side of the tube blank is attached to the die surface.

Step 6. The high pressure source continues to inject the liquid medium to a target value, and corners of the part are formed; the displacement sensors feedback signals to the control system; the control system determines that the current transition corner radii of the formed part meet a dimensional accuracy requirement; then, the high pressure source releases the pressure; the die is open, thereby obtaining a hydroformed part meeting a design requirement.

According to an embodiment, the disclosure associates the volume of the liquid medium with the dimensional accuracy of the hydroformed part, and provides a method and system for controlling dimensions of metal hydroformed parts, which relate to the dimensional accuracy control over the corner of the hydroformed part. The basic conception is that the variation of the inner cavity volume is a constant value from the tube blank to the target part in the hydroforming process, and the dimensional accuracy of the tubular part is controlled by measuring and controlling, in real time, the volume of the liquid injected into the tube blank.

Various embodiments of the disclosure may have one or more of the following effects.

Some embodiments of the disclosure may provide apparatus, methods, and systems for improving the accuracy of the dimensions of the metal hydroformed parts in hydroforming process. The apparatus, methods, and systems may be easy to implement, promote, and apply in production. Control apparatus, control methods, and control systems provided in the disclosure may have simple implementation steps and a mature process technique.

In some embodiments, precise control over the accuracy of the corner radius of the tubular part may be implemented through liquid volume loading. The problems of a large size scatter, poor accuracy, and a low rejection rate of the conventional pressure loading-based hydroforming may be solved. The control approach for the dimensional accuracy of the hydroformed part may be simplified. By controlling only one process parameter, that is, the volume increment, dimensional accuracy of parts may be formed from tube blanks in different batches may meet the design requirement.

In other embodiments, the corner of the tube does not need to be attached to the die surface during forming, which may lower the accuracy requirement of the die. When the corner radius of the target part is greater than or equal to the corner radius of the die, the formed corner does not need to be attached to the die surface, and a corner radius meeting the design requirement may be obtained by merely controlling the volume increment of the injected liquid. The corner accuracy of the hydroformed part is not dependent on the accuracy of the die, but is dependent on the accuracy of the volume of the injected liquid.

In further embodiments, one set of die may be used for hydroforming parts with different corner radii. Because the corner radii of parts and the liquid volume increments may be in a one-to-one corresponding relationship, on the premise that the corner radius of the target part is greater than or equal to the corner radius of the die, a corresponding liquid volume increment may be calculated provided that an expected target value of the corner radius is given. In the forming process, by merely controlling the volume increment of the injected liquid, a corresponding corner radius of the part may be obtained. There is no corner attached to the die surface in this process. Therefore, parts with different corner radii may be obtained while the inner cavity of the die remains constant.

Additional embodiments of the disclosure may further have one or more of the following effects. According to a dimensions control method and system for a metal hydroformed part, by using a quantitative relationship between a liquid volume increment and a corner radius of a tubular part, dimensional accuracy of a corner of a hydroformed part may be controlled precisely by merely controlling a volume increment of an injected liquid. The dimensional accuracy of the corner of the tubular parts may be dependent not on the accuracy of the die or the value of an internal pressure, but may be dependent on the accuracy of the liquid volume increment. Compared with the conventional method for controlling dimensions of a formed part by using such a variable as internal pressure, the disclosure controls the dimensions of the formed part by using a constant quantity, which may achieve one or more of the advantages such as real-time precise control over the dimensional accuracy, low requirements on the accuracy of a die, high process stability, and low costs. The disclosure may provide a method and system for controlling dimensions of a metal hydroformed part, which may solve the problems such as low accuracy and a large scatter of dimensions of a formed part in the existing pressure control-based hydroforming technology.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A method for controlling dimensions of a metal hydroformed part, wherein:
   a dimensional accuracy of a tubular part is controlled through a volume of a liquid injected into a tube blank; and
   a technical process of the method comprises the steps of:
      obtaining an inner cavity volume of a target part and an inner cavity volume of the tube blank;
      injecting the liquid into the tube blank under a high-pressure condition;
      determining a liquid volume compression compensation quantity according to the inner cavity volume of the target part;
      determining a liquid volume increment-target part corner radius relationship according to the inner cavity volume of the target part, the inner cavity volume of the tube blank, and the liquid volume compression compensation quantity, comprising:
         determining the liquid volume increment-target part corner radius relationship using a formula $$\Delta V_L = (V - V_0) + \frac{t\sigma_s V}{E_V r - t\sigma_s},$$

wherein:
ΔV_L is the liquid volume increment,
V is the inner cavity volume of the target part,
V_0 is the inner cavity volume of the tube blank,
t is a wall thickness of the part,
σ_s is a material yield strength of the tube blank,
E_V is a bulk modulus of the liquid medium, and
r is a radius of a cross-section transition corner of the target part;
determining a liquid volume increment according to the liquid volume increment-target part corner radius relationship; and
controlling dimensions of a metal part according to the liquid volume increment to form a metal hydroformed part.

2. The control method according to claim 1, wherein the determining the liquid volume compression compensation quantity according to the inner cavity volume of the target part comprises the steps of:
obtaining the bulk modulus of the liquid medium injected into the tube blank; and
determining the liquid volume compression compensation quantity according to the liquid bulk modulus and the inner cavity volume of the target part.

3. The control method according to claim 1, wherein the determining the liquid volume increment according to the liquid volume increment-target part corner radius relationship comprises the steps of:
obtaining an expected corner radius of the target part, the expected corner radius being a corner radius of the target part after forming; and
determining the liquid volume increment according to the liquid volume increment-target part corner radius relationship and the expected corner radius.

4. A dimensions control system for a metal hydroformed part, comprising:
an inner cavity volume obtaining module, configured to obtain an inner cavity volume of a target part and an inner cavity volume of a tube blank;
a liquid volume compression compensation quantity determining module, configured to inject a liquid into the tube blank under a high pressure condition, and determine a liquid volume compression compensation quantity according to the inner cavity volume of the target part;
a liquid volume increment-target part corner radius relationship determining module, configured to determine a liquid volume increment-target part corner radius relationship according to the inner cavity volume of the target part, the inner cavity volume of the tube blank, and the liquid volume compression compensation quantity, comprising:
a liquid volume increment-target part corner radius relationship determining unit, configured to determine the liquid volume increment-target part corner radius relationship by a formula $$\Delta V_L = (V - V_0) + \frac{t\sigma_s V}{E_V r - t\sigma_s},$$

wherein:
ΔV_L is the liquid volume increment,
V is the inner cavity volume of the target part,
V_0 is the inner cavity volume of the tube blank,
t is a wall thickness of the part,
σ_s is a material yield strength of the tube blank,
E_V is a bulk modulus of the liquid medium, and
r is a radius of a cross-section transition corner of the target part;
a liquid volume increment determining module, configured to determine a liquid volume increment according to the liquid volume increment-target part corner radius relationship; and
a control module, configured to control dimensions of a metal tube according to the liquid volume increment, to form a metal hydroformed part.

5. The control system according to claim 4, wherein the liquid volume compression compensation quantity determining module comprises:
a liquid bulk modulus obtaining unit, configured to obtain the bulk modulus of the liquid medium injected into the tube blank; and
a liquid volume compression compensation quantity determining unit, configured to determine the liquid volume compression compensation quantity according to the liquid bulk modulus and the inner cavity volume of the target part.

6. The control system according to claim 4, wherein the liquid volume increment determining module comprises:
an expected corner radius obtaining unit, configured to obtain an expected corner radius of the target part, the expected corner radius being a corner radius of the target part after forming; and
a liquid volume increment determining unit, configured to determine the liquid volume increment according to the liquid volume increment-target part corner radius relationship and the expected corner radius.

* * * * *